United States Patent
Younggren et al.

(10) Patent No.: US 11,485,225 B2
(45) Date of Patent: Nov. 1, 2022

(54) DRIVETRAIN LAYOUT WITH CVT

(71) Applicant: TEAM Industries, Inc., Bagley, MN (US)

(72) Inventors: Bruce H. Younggren, Bemidji, MN (US); Joel Dunlap, Bemidji, MN (US); Gregory Lee Maki, Solway, MN (US); Jordan E. Fisk, Bemidji, MN (US); Alexander C. Yudell, Bemidji, MN (US)

(73) Assignee: TEAM Industries, Inc., Bagley, MN (US)

( * ) Notice: Subject to any disclaimer, the term of this patent is extended or adjusted under 35 U.S.C. 154(b) by 75 days.

(21) Appl. No.: 16/796,488

(22) Filed: Feb. 20, 2020

(65) Prior Publication Data
US 2020/0262292 A1    Aug. 20, 2020

Related U.S. Application Data

(60) Provisional application No. 62/808,272, filed on Feb. 20, 2019.

(51) Int. Cl.
*B60K 17/04* (2006.01)
*B60K 17/02* (2006.01)
(Continued)

(52) U.S. Cl.
CPC .............. *B60K 17/04* (2013.01); *B60K 17/02* (2013.01); *B60K 17/28* (2013.01); *B60K 25/02* (2013.01);
(Continued)

(58) Field of Classification Search
CPC ........ B60K 17/04; B60K 17/02; B60K 17/28; B60K 57/0441; B60K 25/02; B60K 17/34;
(Continued)

(56) References Cited

U.S. PATENT DOCUMENTS 5,470,285 A * 11/1995 Schneider .............. B60K 17/06
180/366
5,690,576 A * 11/1997 Moroto ............... F16H 37/0846
475/211
(Continued)

FOREIGN PATENT DOCUMENTS

CA           2456633 A1     7/2004
DE         20014160 U1    11/2001
(Continued)

OTHER PUBLICATIONS

International Bureau, "International Preliminary Report on Patentability from PCT Application No. PCT/US2020/019068", from Foreign Counterpart to U.S. Appl. No. 16/796,488, dated Sep. 2, 2021, pp. 1 through 10, Published: WO.
(Continued)

*Primary Examiner* — Tinh Dang
(74) *Attorney, Agent, or Firm* — Fogg & Powers LLC

(57) ABSTRACT

A drivetrain layout that includes a primary gear reduction, a continuously variable transmission (CVT), a peak torque limiting (PTL) device and a range box is provided. The primary gear reduction is operationally engaged to an output of a motor. The CVT includes a primary pulley and a secondary pulley. The primary pulley of the CVT is operationally engaged to the primary gear reduction. The primary gear reduction reduces a rotational speed of the output of the motor that is coupled to the primary pulley of the CVT. The range box is operationally engaged with the secondary pulley of the CVT. The range box is configured to coupled torque between the CVT and wheels of a vehicle. The PTL device in operational engagement between the secondary pulley of the CVT and the range box, the PTL device configured to protect the drivetrain layout from torque transients.

23 Claims, 17 Drawing Sheets

(51) Int. Cl.
*B60K 17/28* (2006.01)
*F16D 7/00* (2006.01)
*F16H 37/02* (2006.01)
*B60K 25/02* (2006.01)
*F16D 3/12* (2006.01)
*F16H 57/04* (2010.01)
*B60K 17/34* (2006.01)

(52) U.S. Cl.
CPC ............... *F16D 3/12* (2013.01); *F16D 7/00* (2013.01); *F16H 37/021* (2013.01); *F16H 37/022* (2013.01); *F16H 57/0441* (2013.01); *B60K 17/34* (2013.01); *B60K 2025/022* (2013.01); *F16H 2702/00* (2013.01); *F16H 2702/02* (2013.01)

(58) Field of Classification Search
CPC ............. B60K 2025/022; F16H 37/021; F16H 37/022; F16H 2702/00; F16H 2702/02; F16D 3/12; F16D 7/00
See application file for complete search history.

(56) References Cited

U.S. PATENT DOCUMENTS

| | | | |
|---|---|---|---|
| 6,461,268 | B1 | 10/2002 | Milner |
| 7,410,042 | B2 | 8/2008 | Ochab et al. |
| 8,298,119 | B2 * | 10/2012 | Jozaki ............... F16H 61/702 477/41 |
| 8,469,856 | B2 | 6/2013 | Thomassy |
| 8,620,539 | B2 | 12/2013 | Urata et al. |
| 8,870,711 | B2 | 10/2014 | Pohl et al. |
| 9,371,896 | B2 * | 6/2016 | Kobayashi ............ F16H 37/021 |
| 9,388,884 | B2 | 7/2016 | Hibino et al. |
| 9,546,719 | B2 * | 1/2017 | Samie ................. F16H 37/021 |
| 10,240,667 | B2 * | 3/2019 | Walter ................. F16H 37/022 |
| 2007/0144283 | A1 | 6/2007 | Hasegawa et al. |
| 2011/0028260 | A1 | 2/2011 | Kawasaki et al. |
| 2013/0096790 | A1 | 4/2013 | Nelson |
| 2015/0345570 | A1 | 12/2015 | Tsukuda et al. |
| 2018/0252315 | A1 | 9/2018 | Rippelmeyer et al. |
| 2018/0363763 | A1 | 12/2018 | Pohl et al. |
| 2019/0093745 | A1 | 3/2019 | Younggren et al. |
| 2019/0242473 | A1 | 8/2019 | Hagihara |
| 2020/0400221 | A1 | 12/2020 | Yudell et al. |
| 2020/0400222 | A1 | 12/2020 | Yudell et al. |
| 2021/0341039 | A1 | 11/2021 | Kuroki |

FOREIGN PATENT DOCUMENTS

| | | |
|---|---|---|
| EP | 0063786 A1 | 11/1982 |
| EP | 184676 A | 6/1986 |
| EP | 0787927 A2 | 8/1997 |
| EP | 2275706 A1 | 1/2011 |
| JP | 2013167322 A | 8/2013 |
| WO | 2007135428 A1 | 11/2007 |
| WO | 2017049049 A1 | 3/2017 |

OTHER PUBLICATIONS

International Searching Authority, "International Search Report and Written Opinion from PCT Application No. PCT/US2020/019068", from Foreign Counterpart to U.S. Appl. No. 16/796,488, dated Apr. 20, 2020, pp. 1 through 13, Published: WO.

U.S. Patent and Trademark Office, "Notice of Allowance", U.S. Appl. No. 16/141,227, dated Jul. 10, 2020, pp. 1 through 13, Published: US.

International Bureau, "International Preliminary Report on Patentability from PCT Application No. PCT/US2018/052607", from Foreign Counterpart to U.S. Appl. No. 16/141,227, dated Apr. 9, 2020, pp. 1 through 7, Published: WO.

International Searching Authority, "International Search Report and Written Opinion from PCT Application No. PCT/US2018/052607 dated Dec. 20, 2018", from Foreign Counterpart to U.S. Appl. No. 16/141,227, pp. 1-13, Published: US.

U.S. Patent and Trademark Office, "Office Action", U.S. Appl. No. 15/141,227, dated Mar. 26, 2020, pp. 1-15, Published: US.

U.S. Patent and Trademark Office, "Restriction Requirement", U.S. Appl. No. 16/141,227, dated Jan. 13, 2020, pp. 1 through 6, Published: US.

U.S. Patent and Trademark Office, "Office Action", U.S. Appl. No. 16/906,464, filed May 2, 2022, pp. 1 through 39, Published: US.

* cited by examiner

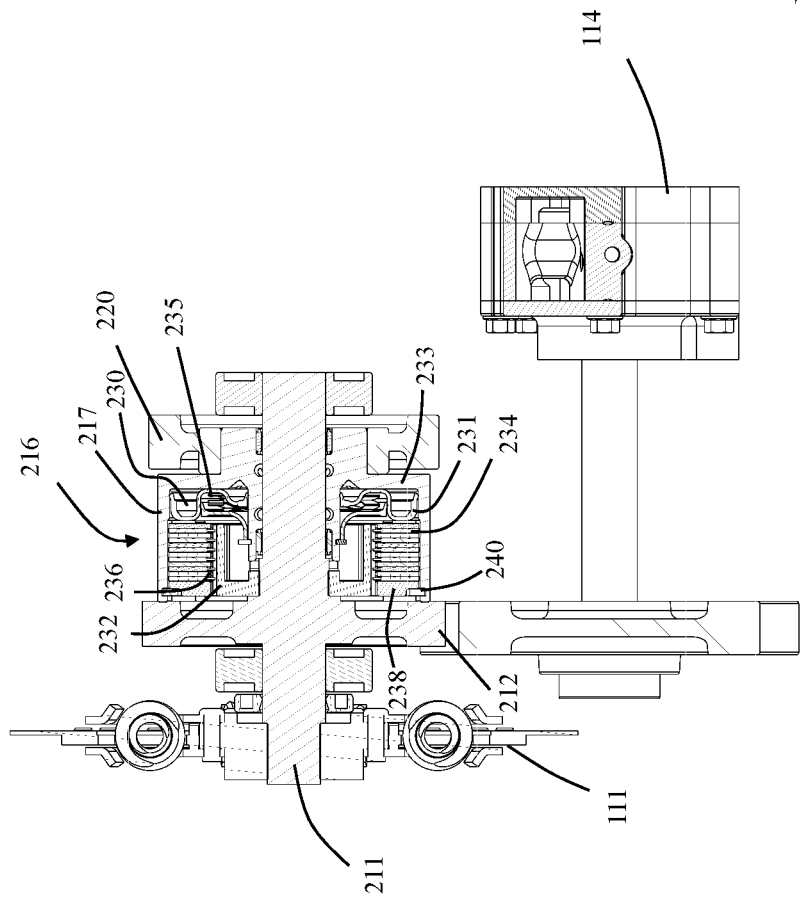

DRIVETRAIN LAYOUT WITH CVT

CROSS-REFERENCE TO RELATED APPLICATIONS

This application claims priority to U.S. Provisional Application Ser. No. 62/808,272 titled "Drivetrain Layout with Steel Belt CVT" filed on Feb. 20, 2019, which is incorporated in its entirety herein by reference.

BACKGROUND

Side by side vehicles are commonly operated in off-road conditions. Vehicles that are operated in off-road conditions are subject to transient torque events that are greater than those seen by on-road vehicles. Example of conditions that generate transient torque include jumps, sharp bumps and even uneven terrain. Transient torque tends to be rapid, high in magnitude and unpredictable. Vehicles that use continuously variable transmissions (CVTs) that are subject to transient torque may result in a slip condition between a belt and pulleys of the CVT if a clamp load is not high enough to manage the transient torque. A slip may be damaging to the CVT and other components of the vehicle. Transient torque is difficult to manage through control strategies since reaction times of control strategies are generally not fast enough to manage the transient torque.

Further, pulleys of CVTs operated at high engine velocities, as is common in side-by-side vehicle operations, may experience hydraulic clamping due to velocity induced pressure gradients in the clamping piston. At pulley speeds greater than 10,000 RPM, the loads can become too high for an effective variator control. The secondary pulley may spin at 2.6 times the primary speed. Typical CVTs for on-road vehicles have an effective limit of around 6,500 engine RPM (eRPM) to be able to deal with hydraulic clamping. Some high performance off road side-by side vehicles may exceed 6500 eRPM.

For the reasons stated above and for other reasons stated below which will become apparent to those skilled in the art upon reading and understanding the present specification, there is a need in the art for an improved drivetrain layout that effectively deals with hydraulic clamping and transient torques.

SUMMARY OF INVENTION

The above-mentioned problems of current systems are addressed by embodiments of the present invention and will be understood by reading and studying the following specification. The following summary is made by way of example and not by way of limitation. It is merely provided to aid the reader in understanding some of the aspects of the invention. Embodiments provide drivetrain layouts that deal with torque transients and reduce the primary pulley speed of a CVT.

In one embodiment, a drivetrain layout that includes a primary gear reduction, a steel belt CVT and a range box is provided. The primary gear reduction is operationally engaged to an output of a motor. The steel belt CVT includes a primary pulley and a secondary pulley. The primary pulley of the steel belt CVT is operationally engaged to the primary gear reduction. The primary gear reduction reduces a rotational speed of the output of the motor that is coupled to the primary pulley of the steel belt CVT. The range box is operationally engaged with the secondary pulley of the steel belt CVT. The range box is configured to couple torque between the steel belt CVT and wheels of a vehicle.

In another embodiment, a drivetrain layout including a primary gear reduction, a CVT, a launch clutch, a range box and a peak torque limiting (PTL) device is provided. The primary gear reduction is operationally engaged to an output of a motor. The CVT includes a primary pulley, a secondary pulley and a belt that is operationally engaged between the primary pulley and the secondary pulley. The primary pulley of the CVT is further operationally engaged to the primary gear reduction. The primary gear reduction reduces a rotational speed of the output of the motor that is coupled to the primary pulley of the CVT. The launch clutch is in operational engagement between the primary gear reduction and the primary pulley of the CVT. The range box is operationally engaged with the secondary pulley of the CVT. The range box is configured to couple torque between the CVT and wheels of a vehicle. The PTL device is in operational engagement between the secondary pulley of the CVT and the range box. The PTL device is configured to protect the drivetrain layout from transients.

In still another embodiment, a vehicle including a motor, a drivetrain layout, at least one differential and a plurality of wheels is provided. The motor is used to generate engine torque. The motor includes an output. The drivetrain layout includes a primary gear reduction, a CVT, a launch clutch, a range box and a PTL device. The primary gear reduction is operationally engaged to the output of a motor. The CVT includes a primary pulley, a secondary pulley and a belt operationally engaged between the primary pulley and the secondary pulley. The primary pulley of the CVT is operationally engaged to the primary gear reduction. The primary gear reduction reduces a rotational speed of the output of the motor that is coupled to the primary pulley of the CVT. The launch clutch is in operational engagement between the output of the motor and the primary pulley of the CVT. The range box is operationally engaged with the secondary pulley of the CVT. The range box is configured to couple torque between the CVT and wheels of a vehicle. The PTL device was in operational engagement between the secondary pulley of the CVT and the range box. The PTL device configures to protect the drivetrain layout from transients. The at least one differential is operationally engaged with the range box. The plurality of wheels are operationally engaged with the at least one differential.

In further yet another embodiment, a drivetrain layout that includes a CVT, a range box, and a PTL is provided. The CVT includes a primary pulley and a secondary pulley. The primary pulley of the CVT is operationally engaged to an output of a motor. The range box is operationally engaged with the secondary pulley of the CVT. The range box is configured to couple torque between the CVT and wheels of a vehicle. The PTL device is in operational engagement between the secondary pulley of the CVT and the range box. The PTL device configured to protect the drivetrain layout from torque transients.

BRIEF DESCRIPTION OF THE DRAWINGS

Embodiments can be more easily understood and further advantages and uses thereof will be more readily apparent, when considered in view of the detailed description and the following figures in which:

FIG. 17 is a cross-sectional side view of a plate style clutch and torsional damper according to one exemplary embodiment.

In accordance with common practice, the various described features are not drawn to scale but are drawn to emphasize specific features relevant to the subject matter described. Reference characters denote like elements throughout Figures and text.

DETAILED DESCRIPTION

In the following detailed description, reference is made to the accompanying drawings, which form a part hereof, and in which is shown by way of illustration specific embodiments in which the inventions may be practiced. These embodiments are described in sufficient detail to enable those skilled in the art to practice the embodiments, and it is to be understood that other embodiments may be utilized and that changes may be made without departing from the spirit and scope of the present invention. The following detailed description is, therefore, not to be taken in a limiting sense, and the scope of the present invention is defined only by the claims and equivalents thereof.

Embodiments provide effective and efficient drivetrain layouts that may include a steel belt CVT. Some embodiments include a gear reduction that allows the primary pulley of the CVT to rotate at less than an associated engine rotation speed. Reducing the primary speed reduces the secondary speed as well and gets the RPM's down to a range where hydraulic clamping can be managed. Hence engine speeds in excess of 6,500 eRPM can be used with the gear reduction of embodiments. Embodiments further reduce the effective inertia of a variator. The effective inertia is the inertia "seen" by the engine crankshaft. Embodiments further improve acceleration by reducing the effective inertia of the driveline. Lower driveline inertia leads to improved fuel efficiency resulting in a greater range on a tank of fuel. In another embodiment, a gear up instead of gear reduction is used. This may be applicable in vehicles that implement diesel motors.

Further some embodiments include a mechanical limiting device, such as a clutch or peak torque limiting (PTL) device, that inherently protects from torque transients. In embodiments, the PTL can be adjusted to slip before an associated belt of the CVT slips. This provides an instantaneous reaction time since it is always set to slip before the belt. The mechanical limiting device allows for less overclamp during routine driving which leads to better efficiency of the transmission (more power to the ground and more range on a tank of gas, etc.) and lower state heat rejection requirements etc.

Figure 1:
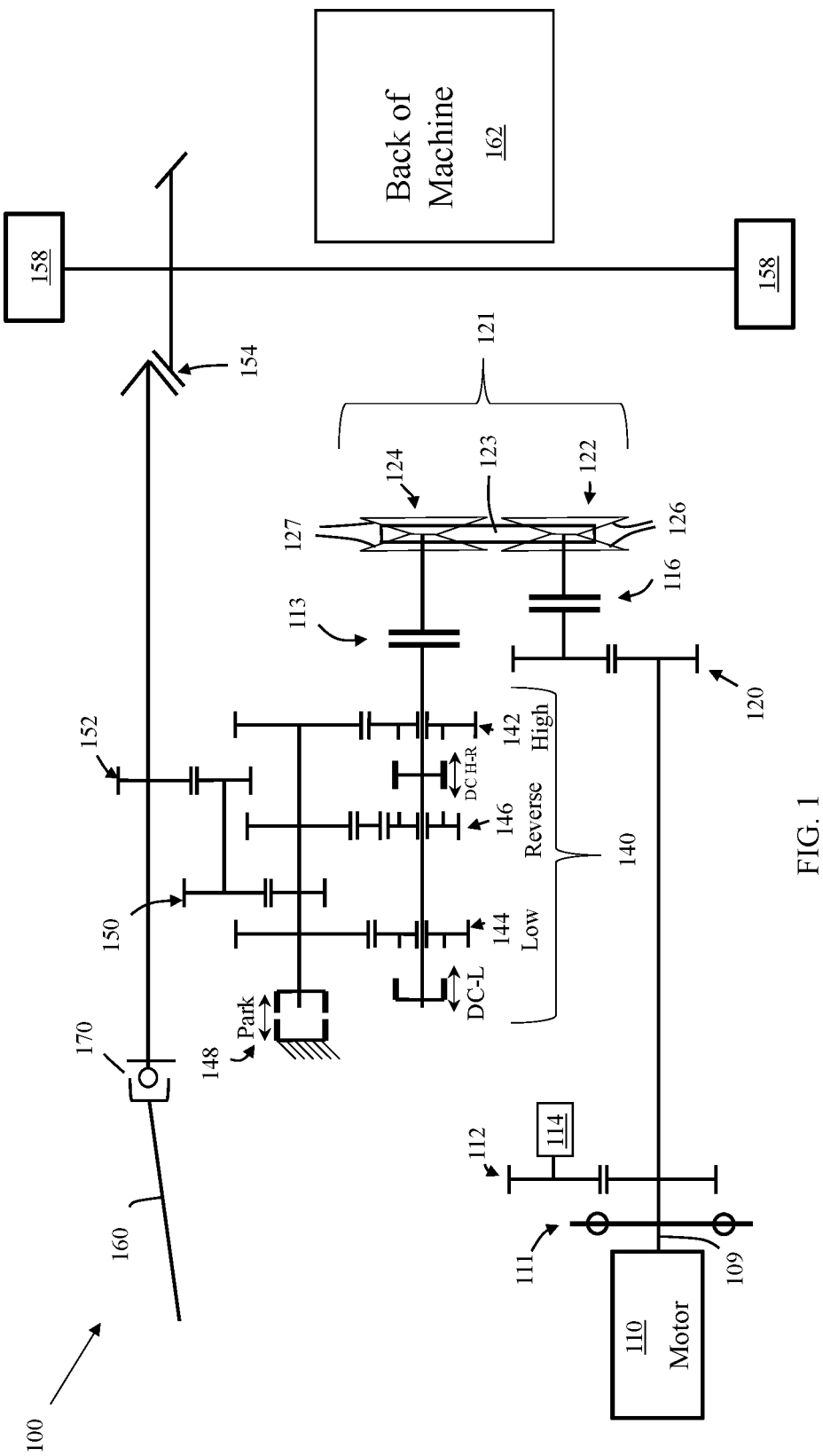
FIG. 1 illustrates a line diagram of a drivetrain layout according to one exemplary embodiment.

A first layout 100 example embodiment is illustrated in the line diagram of FIG. 1. As illustrated, a motor 110, such as an internal combustion engine, electric motor or any other type of torque generating device, is connected to a range box 140 via a torsional damper 111 in this example. However, a torsional damper 111 is not required for this design to function and hence other embodiments do not include a torsion damper 111. In the example embodiment of FIG. 1, engine torque is coupled to a gear reduction 112 and to a pump 114. Further in some low peak eRPM configurations, this coupling may be to a gear increase. Examples of gear reduction 112 is a gear set, a chain drive, a belt drive and the like. However, any type of reduction may be used that allows the pump 114 to be driven in concert with a crank shaft 109 (input shaft) of the motor 110. The pump 114 may even be on the same axis as the crank shaft 109 in an embodiment. In the example layout of FIG. 1, however, the gear reduction 112 is placed between the pump 114 and the crank shaft 109 of the motor 110. Since the pump 114 is in torsional communication with the crank shaft 109, the pump 114 is turning as the motor 110 is generating engine torque.

Figure 15:
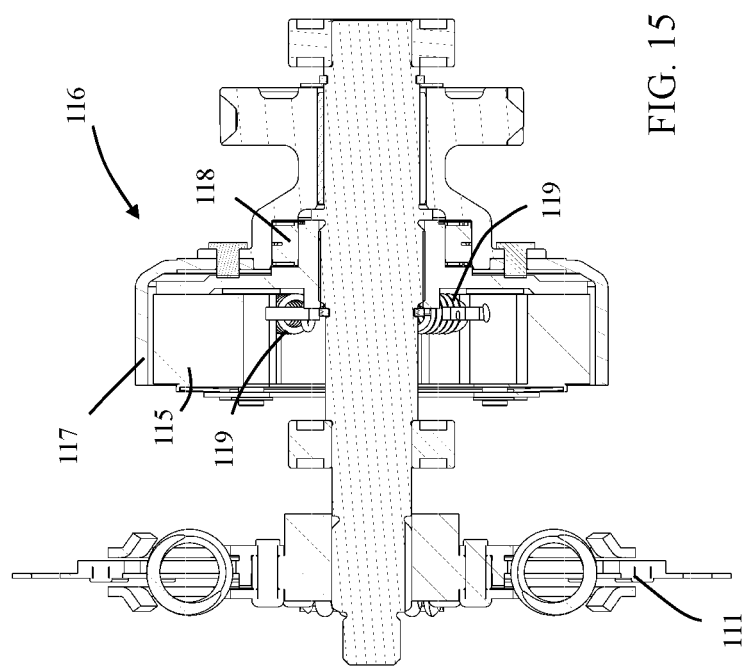
FIG. 15 is a cross-sectional side view of a shoe type centrifugal clutch and torsional damper according to one exemplary embodiment.
Figure 16:
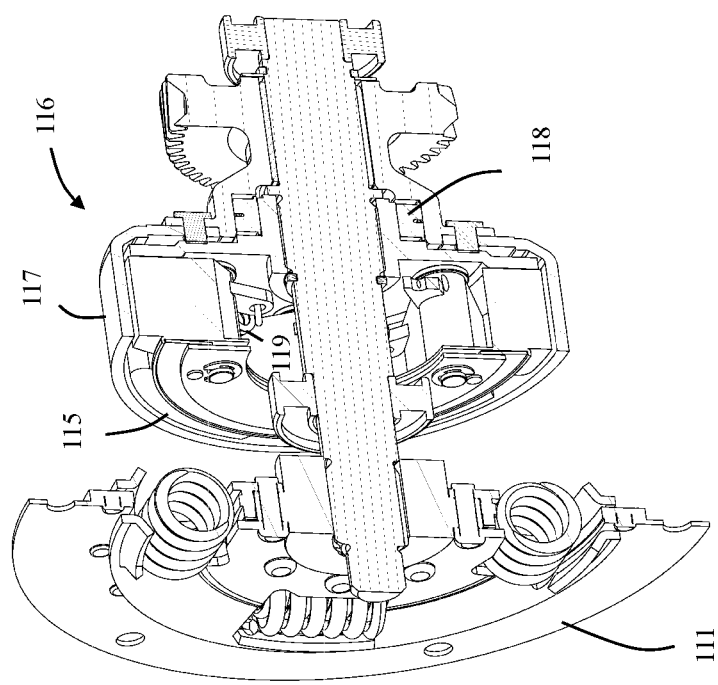
FIG. 16 is a cross-sectional side perspective view of the clutch and torsional damper of FIG. 15.

Engine torque is passed through a first gear reduction stage 120 to a starter clutch 116 (first clutch). Different types of starter or launch clutches 116 may be used such as a shoe type centrifugal clutch, wet plate style clutch, dry clutch etc. Examples of how two different types of starter clutches work in embodiments are herein described. In a first shoe type centrifugal type example, as best illustrated in FIGS. 15 and 16, the starter clutch 116 engages based on centrifugal force created by RPM of the motor 110. When an operator applies the throttle and the motor starts to increase in RPM, shoes 115 start to move outwards via centrifugal force and pull against the springs 119. When there is enough RPM for the shoes 115 to overcome the springs 119 the shoes 115 contact the outer basket 117 and start to apply power through the clutch 116. Likewise, when the operator lets off the throttle and the engine comes down in RPM to an idle the starter clutch 116 disengages. This happens because when the RPM of the motor drops, the shoes 115 slow down and create less centrifugal force. At a low enough RPM, the springs 119 overcome the centrifugal force and the shoes 115 of the clutch. When this happens, there is not enough force present to transmit power through friction to an outer basket.

The shoe style of clutch works very well for driving a vehicle. It does not, however, provide engine braking to the vehicle. To achieve engine braking, a one-way bearing 118 is often designed into the clutch 116. Engine braking occurs through the one way bearing 118 when the wheels 158 of the vehicle want to deliver power through the drivetrain back towards the motor 110. This happens when the wheel side of the starter clutch 116 wants to go faster than the motor side of the starter clutch 116 and the throttle is at a low position, often off throttle. When there is little if any throttle input from the operator, the motor 110 wants to go to a lower RPM where the shoes 115 disengage from the outer basket 117. When this happens there is no longer a direct coupling between the engine 110 and the tires 158. When the tires 158 want to drive the tire side of the clutch 116 faster than the engine 110, the one way bearing 118 will engage and deliver power from the tires 158 to the engine 110. This creates engine braking. When the tire side of clutch 116 slows down to a point where it is going slower than the engine side of the clutch 116, the one way bearing 118 releases. While operating the vehicle down a hill, if an operator applies the throttle the motor 110 will increase in RPM, the shoes 115 will increase centrifugal force and overcome the spring force from the springs 119, therein creating enough force to the outer basket 117 to transmit toque and engage the clutch 116. When this happens the engine side of the clutch 116 starts going as fast as the tire side of the clutch 116 and the one way bearing 118 releases.

If the starter clutch is a plate style wet clutch, such as clutch 216 illustrated best in FIG. 17, the clutch 216 may be engaged with the use of hydraulic pressure, electronically via a ball ramp or some other activation system where a controller and algorithm decide when the clutch 216 should be engaged. A one way clutch 118 is often not needed with use of this type of clutch. However, some embodiment may still use a one way clutch arrangement.

In the layout illustrated in FIG. 17, a transmission input shaft 211 is operatively connected to the torsional damper 111. The power from the engine 110 goes through the torsional damper 111 and into the transmission input shaft 211. A pump pinion 212 is connected to the transmission input shaft 211. This pump pinion 212 drives a mating gear and turns the pump 114. The clutch inner basket 232 is operatively connected to the transmission input shaft 211 and, like the pump, always spins, when the motor is spinning. A plurality of friction plates 236 are operatively connected to the clutch inner basket 232. A plurality of reaction plates 234 are operatively connected to the outer clutch basket 217. These may be flipped in other embodiments. The outer clutch basket 217 is operatively connect to a gear 220 that mates with another gear and drives the primary pulley 122 of the CVT 121. The clutch inner basket 232 may be operationally coupled to the gear 220 in another embodiment. Further still, in other embodiments, the clutch inner basket 232 may be operationally coupled to the primary shaft and the outer clutch basket 217 is operationally coupled to always spin with the motor through a gear reduction. Further in an embodiment the clutch inner basket 232 may be operationally coupled to the motor 110 through a gear reduction and the outer clutch basket 217 may be operationally coupled to the primary shaft. Hence, in some embodiments the launch clutch 116 (for example launch clutch 216) is positioned upstream of the gear reduction 120 while in other embodiments the launch clutch 116 may be positioned downstream of the gear reduction. Further in another embodiment, the launch clutch 116 is a torque converter 116.

A controller (such as controller 164 illustrated in FIG. 3) is in communication with a plurality of sensors 165-1 through 165-*n*. The controller 164 reads a number of vehicle inputs such as engine RPM, throttle position, gear position, line pressure, wheel RPM, temperature sensor, operator presence (seat sensor), seal belt sensor, parking brake sensor, service brake sensor, etc. via sensor signals and determines when the clutch 216 should be engaged. When the controller 164 determines that the clutch (such as clutch 116 in the embodiment illustrated in FIG. 3) should engage and the vehicle should start moving it sends a signal to a control valve 166. The control valve 166 then changes position and pressure is applied an oil/hydraulic line that sends oil to a cavity 230 where the piston 231 applies force to the clutch pack (friction and reaction plates 236 and 234) as best illustrated in FIG. 17. This force is reacted in the outer basket 217 by way of a pressure plate 238 and a retaining ring 240. Other systems besides a retaining ring may be used.

The clamping forces are maintained inside the outer basket 217 on one side by the wall 233 of the basket 217 and on the other side by a retaining ring 240. As the pressure increases in the chamber 230 force is applied to the clutch pack (friction and reaction plates 236 and 234) and the vehicle starts to move. When the operator decides to slow down and the motor 110 slows down, the controller 164 will monitor vehicle performance through the plurality of sensors 165-1 through 165-*n* and keep the clutch 216 engaged until it determines to release the clutch 216. When the controller determines it is time to release the clutch 216 it sends a signal through the control valve 166 to release pressure to the clutch 216. Pressure will drop in cavity 230 and the clutch will release with aid of a biasing member 235 (which may be a spring 235 in an embodiment). During engine braking, the controller 164, through an algorithm, will be able to determine that there is engine braking happening and that the clutch 216 should stay engaged. The controller 164, again through algorithms, will be able to determine engine braking is occurring and keep the clutch engaged until a pre-determined RPM say 100-200 or more RPM above idle is reached then it will tell the control valve 166 to drop pressure and the clutch 216 will release. With aid of the controller 164 and the control valve 166 the engagement and disengagement of the clutch 216 can be finely tuned. This type of wet clutch can also be used for limiting torque through the vehicle.

Vehicles in the powersports market often create very high shock loads through the system. This is because there are high inertia parts, such as the steel belt CVT 121, spinning at a high RPM thus having a high amount of kinetic energy stored. When a vehicle in this market is jumped, as they often are, upon landing there is a torque spike through the drivetrain due to rapid deceleration or acceleration of the high inertia parts. If there is PTL 113 in the system, it will slip therein limiting the amount of spike torque through the transmission. With this type of PTL 113 controlled via a controller 164 and valves 166, an algorithm can be created to drop or adjust pressure in the clutch 113 and allow it to slip. Via the controller 164 and valves 166 this clutch 113 can be set to always slip before the steel belt 123 slips and before too large of a spike torque damages something in the range box 140.

Powersports vehicles are often operated in remote areas that are away from common services such as towing or roadside assistance. It is therefore often up to the user to recover a broken down vehicle. The PTL can also serve as a disconnect between the wheels and the variator when the damaged vehicle is towed by another. The disconnect is necessary to prevent variator from spinning with zero pressure in pistons 128 and 129 due to a stopped engine. Spinning the variator with zero pressure and residual torque from the engine or launch clutch drag may result in slip between belt 123 and sheave 126 and 127 and subsequent damage.

Figure 5:
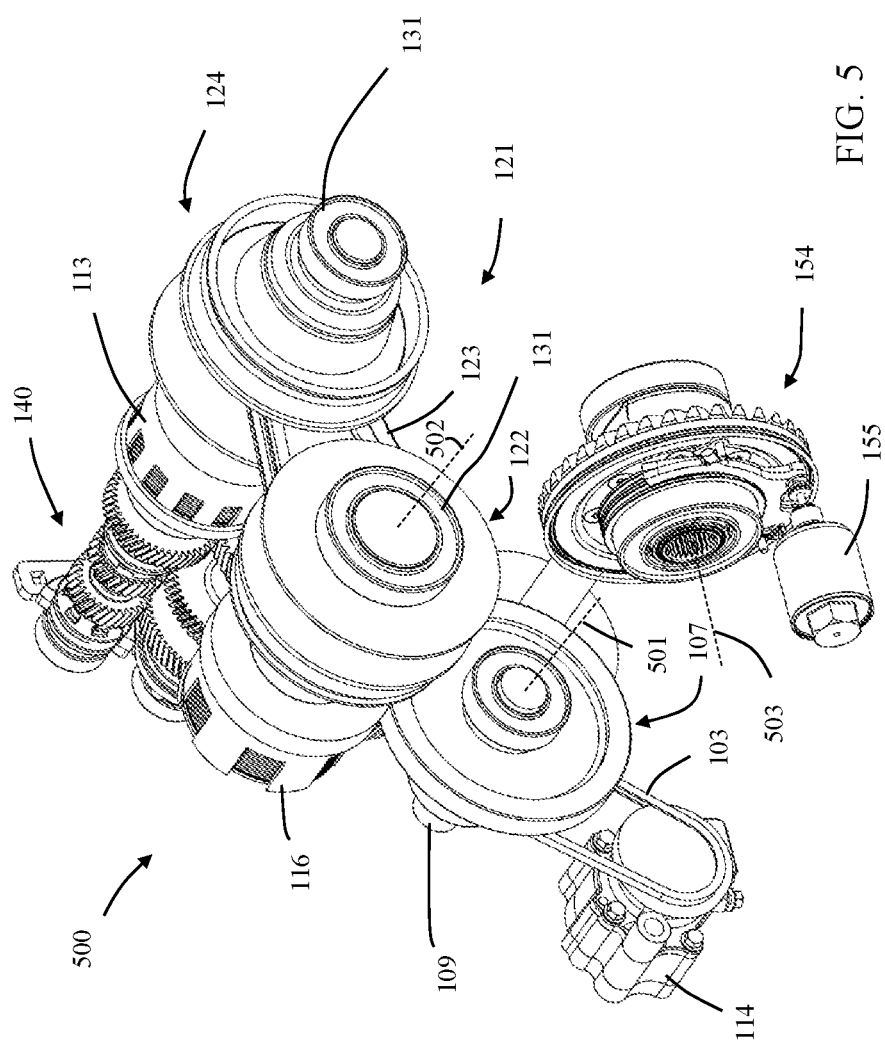
FIG. 5 is a side perspective view of a portion of a drivetrain according to one exemplary embodiment.
Figure 8:
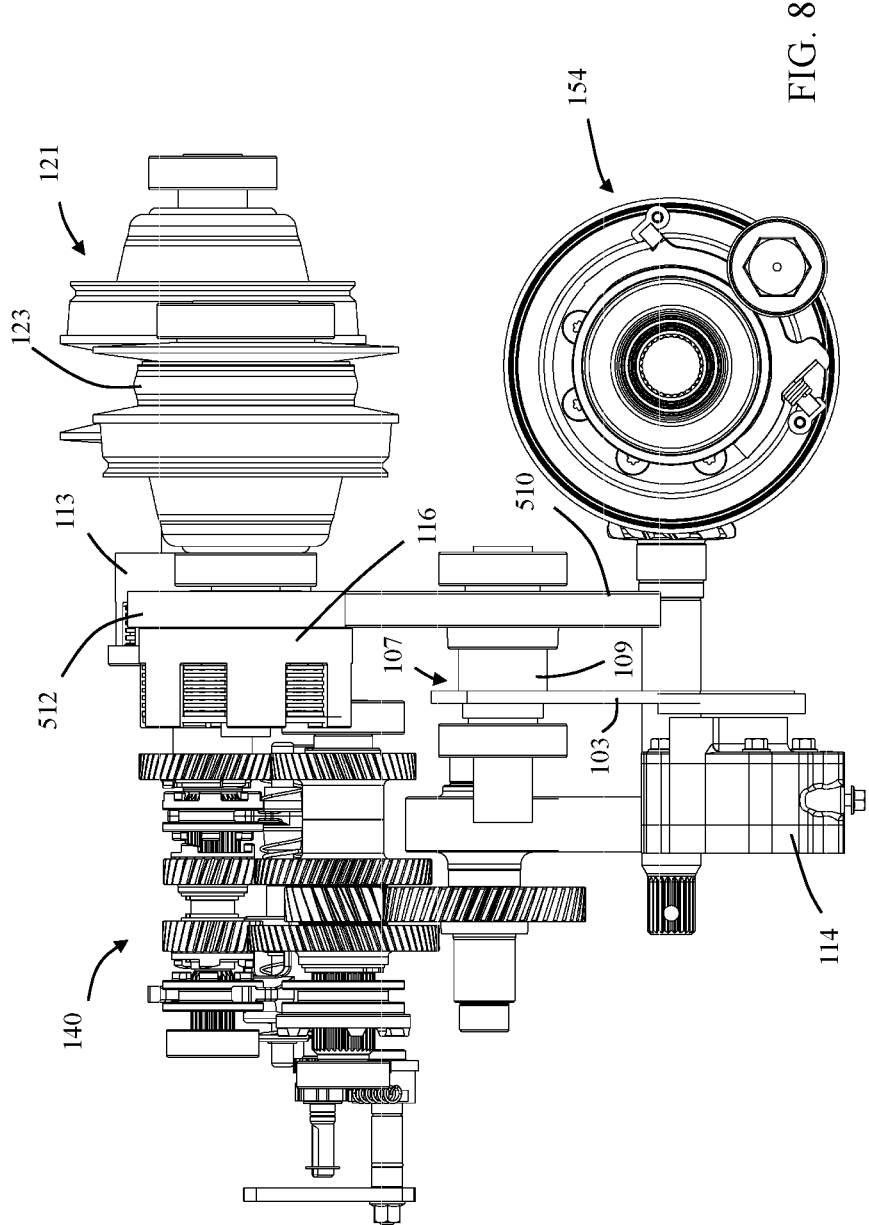
FIG. 8 is a side view of the portion of the drivetrain of FIG. 5.
Figure 9:
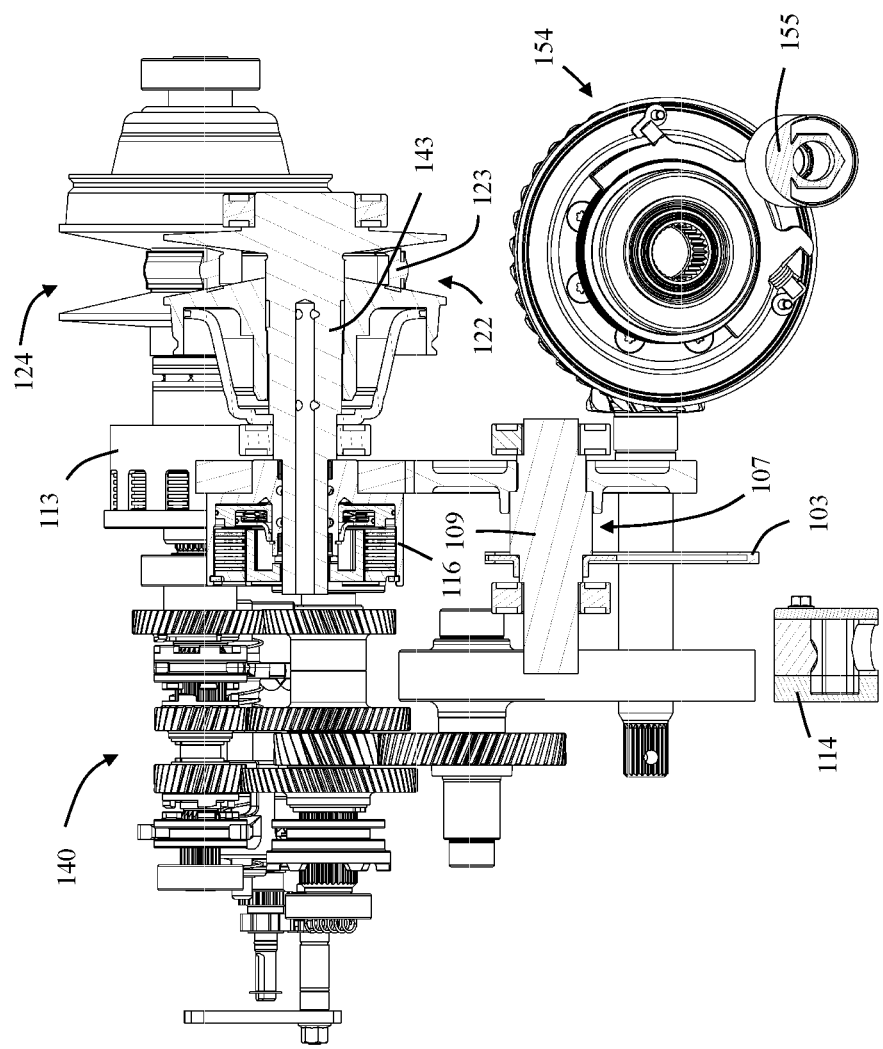
FIG. 9 is a top view of the portion of the drivetrain of FIG. 5 with a cross-sectional view of the primary pulley and input shaft assembly.
Figure 10:
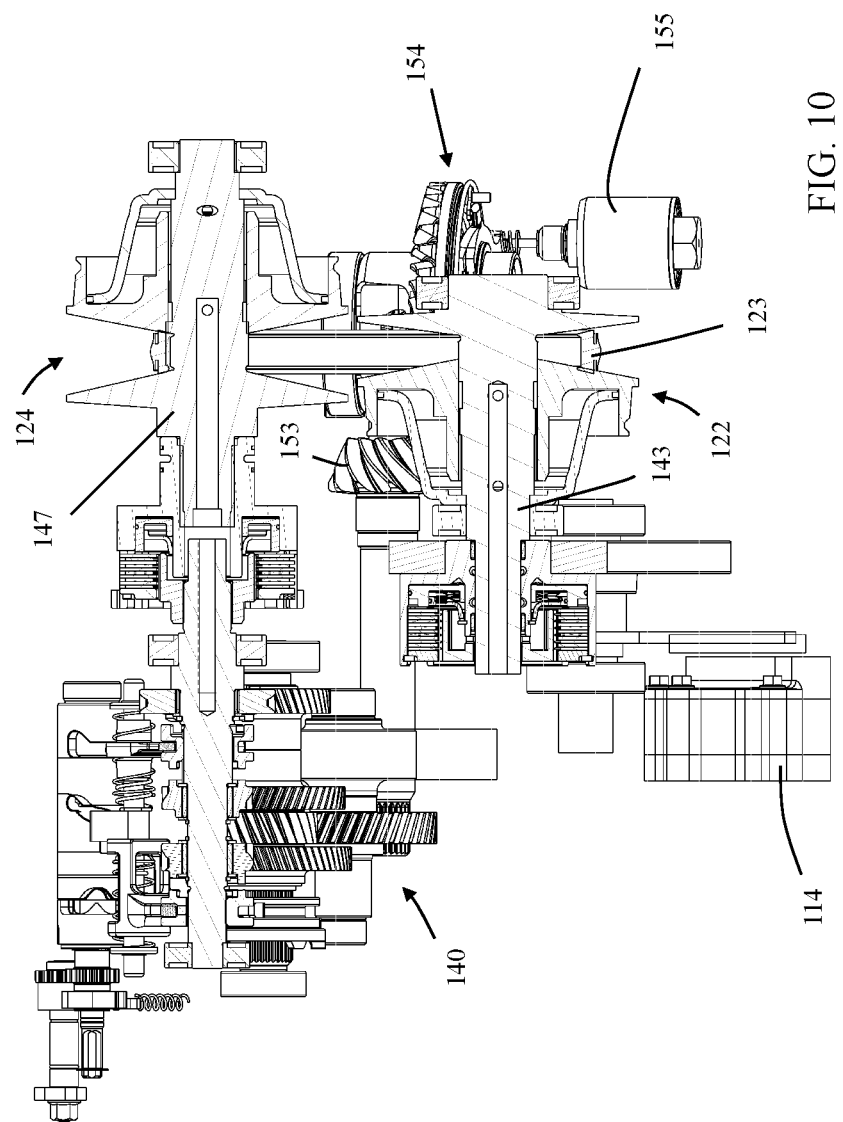
FIG. 10 is a top view of the portion of the drivetrain of FIG. 5 with cross-sectional views of the primary pulley and secondary pulley.

Referring back to FIG. 1, the drivetrain layout 100 in this example embodiment includes a first gear reduction 120 between the engine 110 and the CVT primary clutch 122 also known as a primary pulley 122 of the CVT 121. The first gear reduction 120 is used to slow down the CVT 121. The motors used in side-by-sides typically spin faster for a given vehicle speed than most automotive engines. To have a reasonable output RPM, the first gear reduction 120 is positioned in front of the CVT primary pulley 122 (i.e. between the motor 110 and the CVT 121). This gear reduction 120 may be a drive and driven parallel axis gear set or any other type of gear reduction such as a planetary, a parallel axis set as sketched, a chain drive, a belt drive etc. As discussed, the primary gear reduction 120 (or first gear set) reduces a rotational speed of the output (crankshaft 109) of the motor 110 received by the primary pulley 122 of the CVT 121. The first gear reduction 120 also allows the positioning of the CVT 121 to be off the axis 501 of the crankshaft 109 (output) of the motor. In one example embodiment, a rotational axis 502 of the CVT 121 is positioned above the axis of the crankshaft 109. This is best illustrated in the example of FIG. 5. Further, the primary gear reduction also allows the CVT 121 to be positioned above the differential axis 503. The primary or first gear reduction 120 in an example includes gear 510 engaged with input shaft assembly 107 and gear 512 that, in this example, is part of the first clutch (or launch clutch 512). This is best illustrated in FIG. 8.

Power is delivered to the primary pulley 122 via a shaft connected to the first gear reduction 120 as illustrated in FIG. 1. The CVT 121 also includes a secondary or secondary pulley 124 that receives power from the primary pulley 122 via a belt 123. This belt 123 connects the primary pulley 122 and the secondary pulley 124. Example types of belts 123 used in a steel belt CVT example include a steel pull chain type chain and a steel push belt. Both types of belts/chains are well known in the industry. Other type of belts, or endless loop members, may also be used. Belt 123 needs to stay tight between the primary pulley 122 and secondary pulley 124 of the CVT 121 during operation.

Figure 14:
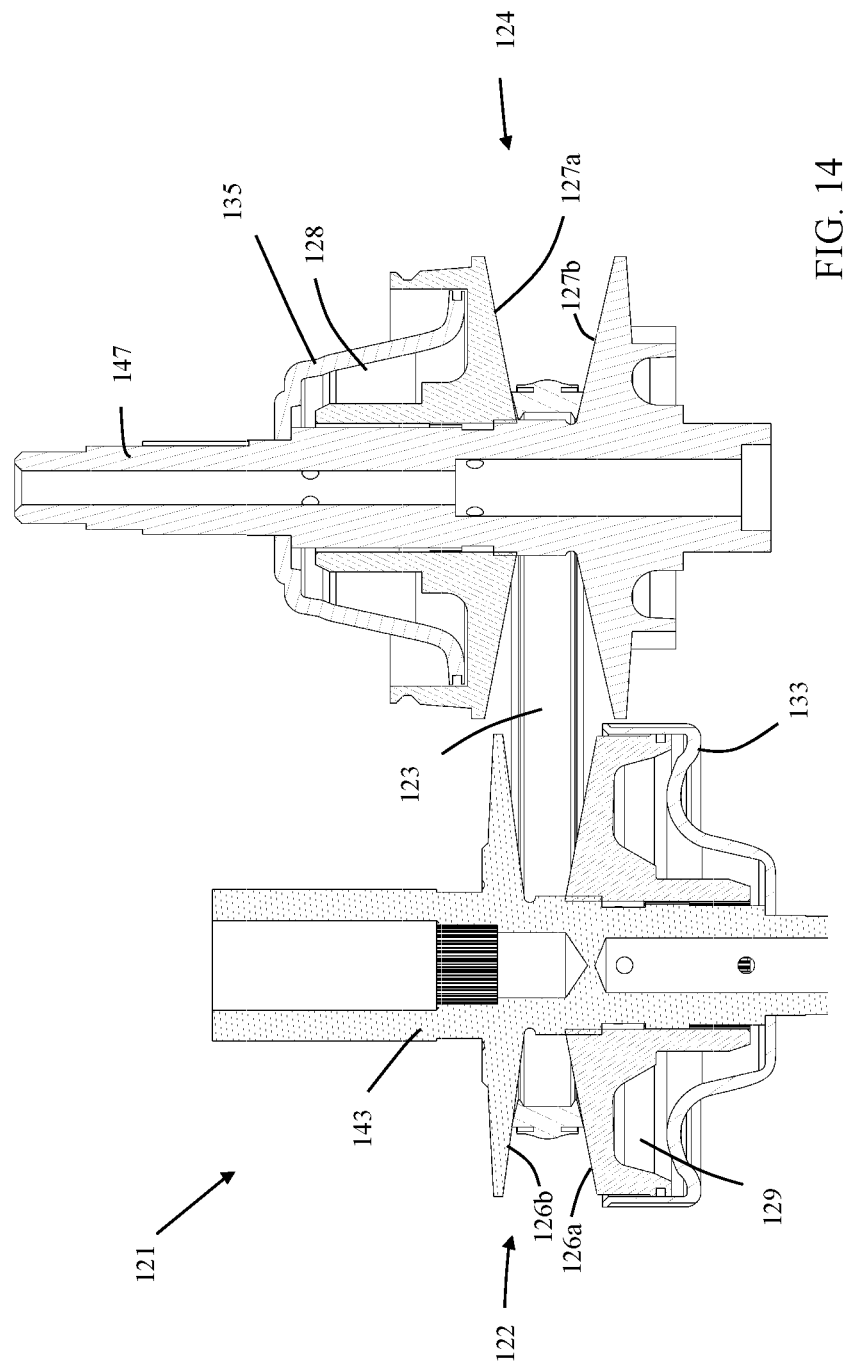
FIG. 14 is a cross-sectional top view of a CVT according to one exemplary embodiment.

Referring to the cross-sectional side view of the CVT 121 of FIG. 14, to clamp the pulleys 122 and 124 on the belt 123, pressurized oil is typically used to create the clamp force. For example, the primary pulley 122 has cavities or pistons 129 behind a movable sheave 126*a* of a pair of sheaves 126 that includes the movable sheave 126*a* and a fixed sheave 126*b*. The secondary pulley 124 in this example has cavities or pistons 128 behind movable sheave 127*a* of a pair of sheaves 127 that include the movable sheave 127*a* and a fixed sheave 127*b*. Oil, flown from the pump 114 pressurizes these cavities 128 and 129. When the pressure is high enough, this clamping force will generate a friction force between the belt 123 and sheaves 126 and 127 and transmit power. The way this system works, in an embodiment, is that the pressure and clamping force will be high enough so when the starter clutch 116 engages, there is enough pressure in the pistons 129 and 128 to create a force in the sheaves 126 and 127 high enough to generate the friction force between the belt 123 and sheaves 126 and 127 that can transmit the torque from the primary to the secondary pulleys 122 and 124 that is transmitted through the launch device. The sheaves 126 and 127 in the primary pulley 122 and secondary pulley 124 have conical surfaces that engage tapered side surfaces on the belt 123. The sheaves 126 and 127 of the primary and secondary pulleys 122 and 124 may be made of a hardened steel.

To control the oil pressure in the pistons 128 and 129, a transmission controller or CVT controller or any computer based controller (such as controller 164 illustrated in FIG. 3) reads signals from different sensors on the vehicle and via an algorithm executed via the controller 164 determines a desired speed ratio to operate the CVT 121. The controller in an example, controls valves 166 and hydraulic circuits to increases or decrease the pressure in pistons 128 and 129 of the respective primary and secondary clutches 122 and 124. Adequate pressure needs to be on the belt 123 from the sheaves 126 and 127 to prevent slipping of the belt 123. The algorithm implemented by the controller 164 in concert with the valves 166 adjust the pressure in the pistons 128 and 129 to keep an adequate force on the belt 123 to overcome friction from torque being applied from the motor 110.

To upshift the ratio in the CVT 121 to a higher ratio, the controller 164 increases the pressure in the cavity 129 of the primary pulley 122. In some situations, a simultaneously drop in the pressure in the cavity 128 of the secondary pulley 124 would occur. This increase in clamp force on the primary pulley 122 and decrease in clamp force on the secondary pulley 124 will result in the primary pulley 122 closing the gap between the stationary sheave 126*a* and movable sheave 126*b*. At the same time, the secondary pulley 124 will increase the distance between the stationary sheave 127*a* and movable sheave 127*b*. In other situations, a simultaneous drop in the clamp force in the secondary pulley 124 does not occur. Whether it is desired to simultaneously drop the pressure in the primary pulley 124 depends on many factors such as throttle position, load on the engine, speed ratio desired etc. The algorithm and tuning of a CVT 121 will determine what signals the controller 164 sends to the control valves 166 thereby increasing or decreasing clamp force in the primary pulley 122 and secondary pulley 124 and changing the speed ratio in the CVT 121.

Oil is used to lubricate and cool the sheaves 126 and 127 of the drive clutch 122, secondary pulley 124 and belt 123 as well as other components of the drivetrain layout. As discussed above, oil is also used to apply the pressure to the movable sheaves 126*a* and 127*a* of the respective primary pulley 122 and secondary pulley 124.

Referring back to FIG. 1, from the secondary pulley 124, power is transmitted to a range box 140 through a second clutch or PTL 113. The PTL 113 is further discussed below. The range box 140 in this example embodiment contains a high gear set 142, a low gear set 144, a reverse gear set 146 and park 148. A third stage gear set 150 is operationally engaged to the range box 140. Further, a fourth stage four gear set 152 is operationally engaged with third gear set 150. Finally, a fifth stage gear set 154 (or output gear set) is in operationally engaged with the fourth gear set 152. The output gear set 154 as illustrated as a bevel gear set in this example. However, the output gear set 154 may be a differential, spool etc. The output gear set 154 is in turn operatively engaged to the rear tires 158 of the vehicle. Further, in this example layout, a pinion 170 on the fourth stage gear set 152 also connects to a prop shaft 160 that connects to a front differential (not shown) that drives the front tires (not shown).

As discussed above, the driveline layout 100 of FIG. 1 has five gear reductions. More-or-less gear reductions may be used. For example, not all gears discussed above are required. It may be desired to have only a forward gear, a reverse gear and a park or just a forward gear and a reverse gear. Or just a plurality of gear sets operatively connecting the secondary pulley 124 to a set of tires 158 may be desired. One feature of this driveline layout 100 is that the vehicle is situated with a longitudinal motor with the crank shaft 109 pointed out towards the back of the machine 162. The first gear set 120 is used to raise the CVT 121 up in the vehicle so it can be situated above the rear output set or rear differential 154. This allows for the entire transmission 110 to be utilized as a transaxle which results in a reduction of needed parts, cost savings as well as being able to fit in vehicles better than a transmission and rear differential connected via a prop shaft.

Figure 2:
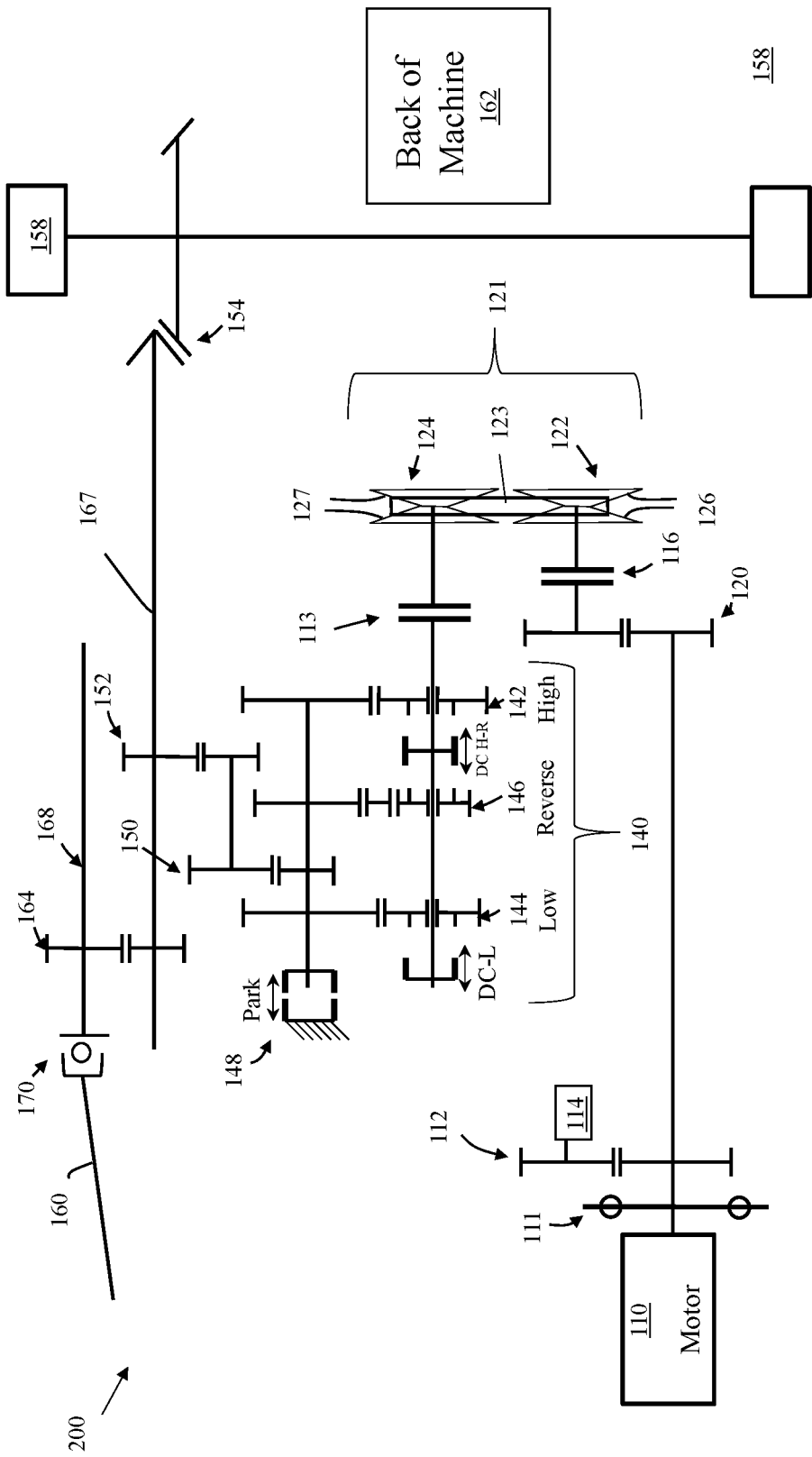
FIG. 2 illustrates another line diagram of a drivetrain layout according to one exemplary embodiment.

A second layout 200 example is illustrated in the line diagram of FIG. 2. The second layout 200 is similar to layout 100 above except there is an extra gear set 164 that connects a pinion shaft 167 of the fifth stage gear set 154 (or output gear set) to a front output shaft 168. The front prop shaft 160 operatively connects to this front output shaft 168 typically at a U-Joint or CV-Joint 170. The reason for extra gear set 164 and front output shaft 168 is so the prop shaft 160 can fit around the motor 110, or so the front and rear prop shafts (drive shafts) can spin at different rates which is important for overrunning clutch type final drives.

Figure 3:
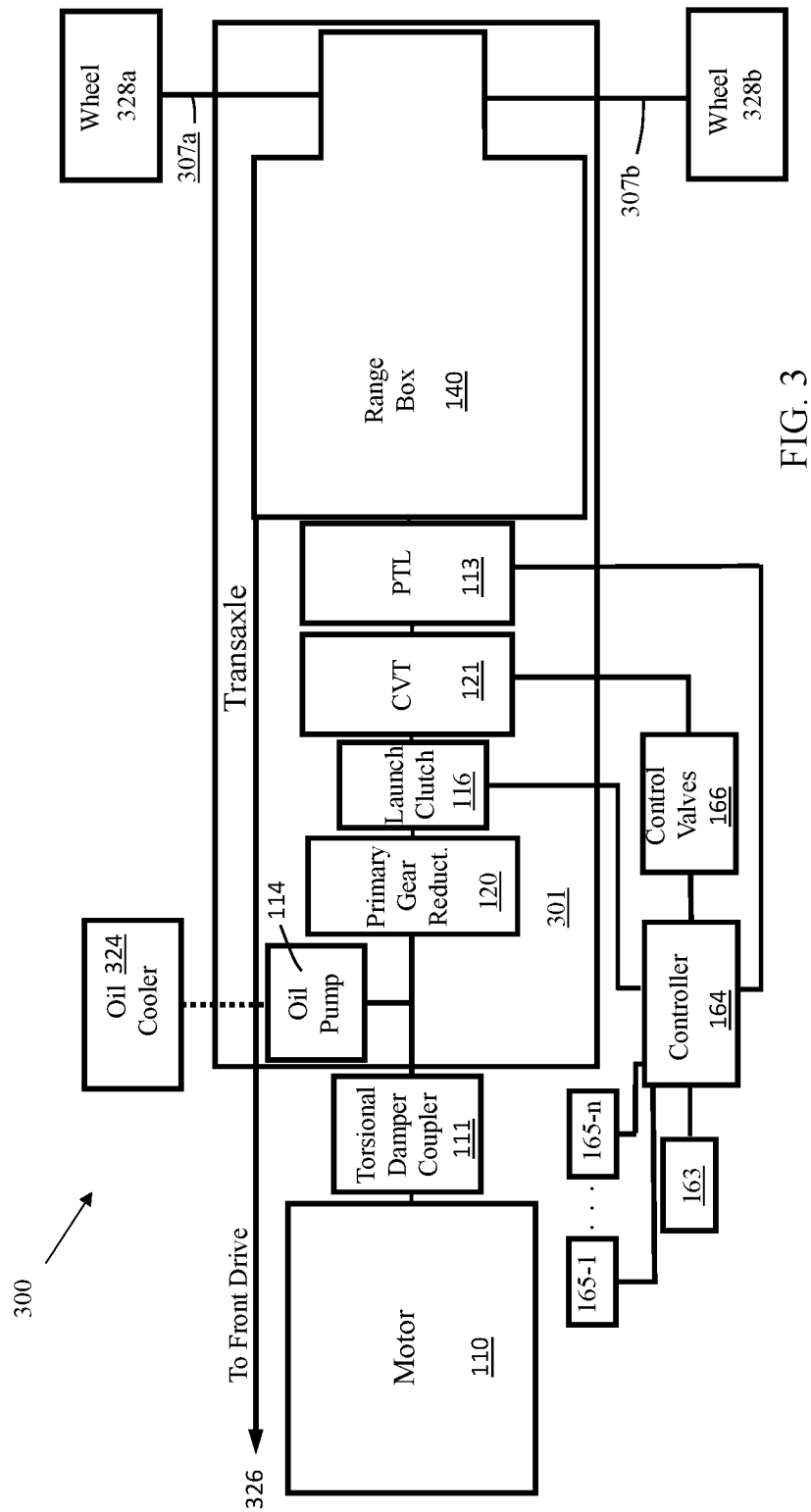
FIG. 3 illustrates a block diagram of a drivetrain layout according to one exemplary embodiment.

Vehicle block diagram 300 of FIG. 3 illustrates a vehicle layout that includes a transaxle 301 of an example embodiment. As illustrated, a motor 110 is operationally connected to a torsional damper coupler 111. The torsional damper coupler 111 in turn is operatively connected to an oil pump 114 and primary gear reduction set 120. The oil pump 114, in this example embodiment, always spins with the torsional damper 111. In some embodiments, the oil pump 114 provides an oil flow to components of the vehicle layout. For example, the oil pump 114 may provide an oil flow to an oil cooler 324, to control valves 166 and in turn to the launch clutch 116 and the CVT 121. The oil pump 114 may be directly coupled to the torsional damper 114 or a gear reduction can be between the torsional damper 114 and the oil pump 114. Regardless, the oil pump 114 is always spinning in concert with the torsional damper 111 and engine 110 in this example embodiment.

Power (or torque) flowing into the torsional damper 111 and oil pump 114 then goes to a launch clutch 116 via the primary gear reduction set 120. Different types of launch clutches may be used. The primary gear reduction 120 moves the CVT 121 off axis of the motor 110 in this embodiment. Torque is further coupled between the CVT 121 and range box 140. In the embodiment of FIG. 3, a PTL 113 (or second clutch) is positioned between the CVT 121 and the range box 140. The range box 140 may contain one gear set or a plurality of gear sets. Further the range box 140 may have just a forward/reverse gear or a hi-low-reverse-park-neutral gear box or any combination of gears desired. The range box 140, in this example, has two outputs, one to the rear wheels 328a and 328b via half shafts 307a and 307b and one to a front gearbox (not shown) via a prop shaft 326. A controller 164 monitors numerous sensors on the vehicle and transmission and determines when to engage clutches, such as the launch clutch 116 and the PTL 113. In one embodiment electronic actuators under the control of the controller 164 are used to selectively engage the clutches 116 and 113. In another embodiment they are activated via hydraulic pressure via control valves 166 under control of the controller 164. The controller 164 further controls the ratio of the CVT 121. It does this by sending signals to control valves 166 that increase or decrease pressure to change ratio in a CVT 121 and if needed engage/disengage the launch clutch 116 and PTL 113 in an embodiment.

In general, the controller 164 may include any one or more of a processor, microprocessor, a digital signal processor (DSP), an application specific integrated circuit (ASIC), a field program gate array (FPGA), or equivalent discrete or integrated logic circuitry. In some example embodiments, controller 164 may include multiple components, such as any combination of one or more microprocessors, one or more controllers, one or more DSPs, one or more ASICs, one or more FPGAs, as well as other discrete or integrated logic circuitry. The functions attributed to the controller 164 herein may be embodied as software, firmware, hardware or any combination thereof. The controller 164 may be part of a system controller or a component controller such as an engine controller or transmission controller. A memory 163 may include computer-readable operating instructions that, when executed by the controller 164 provides functions of the transmission. Such functions may include the functions of controlling the gear ratio of the CVT 121 and the activation of the launch clutch 116 and PTL 113. The computer readable instructions may be encoded within the memory 163. Memory 163 is an appropriate non-transitory storage medium or media including any volatile, nonvolatile, magnetic, optical, or electrical media, such as, but not limited to, a random access memory (RAM), read-only memory (ROM), non-volatile RAM (NVRAM), electrically-erasable programmable ROM (EEPROM), flash memory, or any other storage medium.

Figure 4:
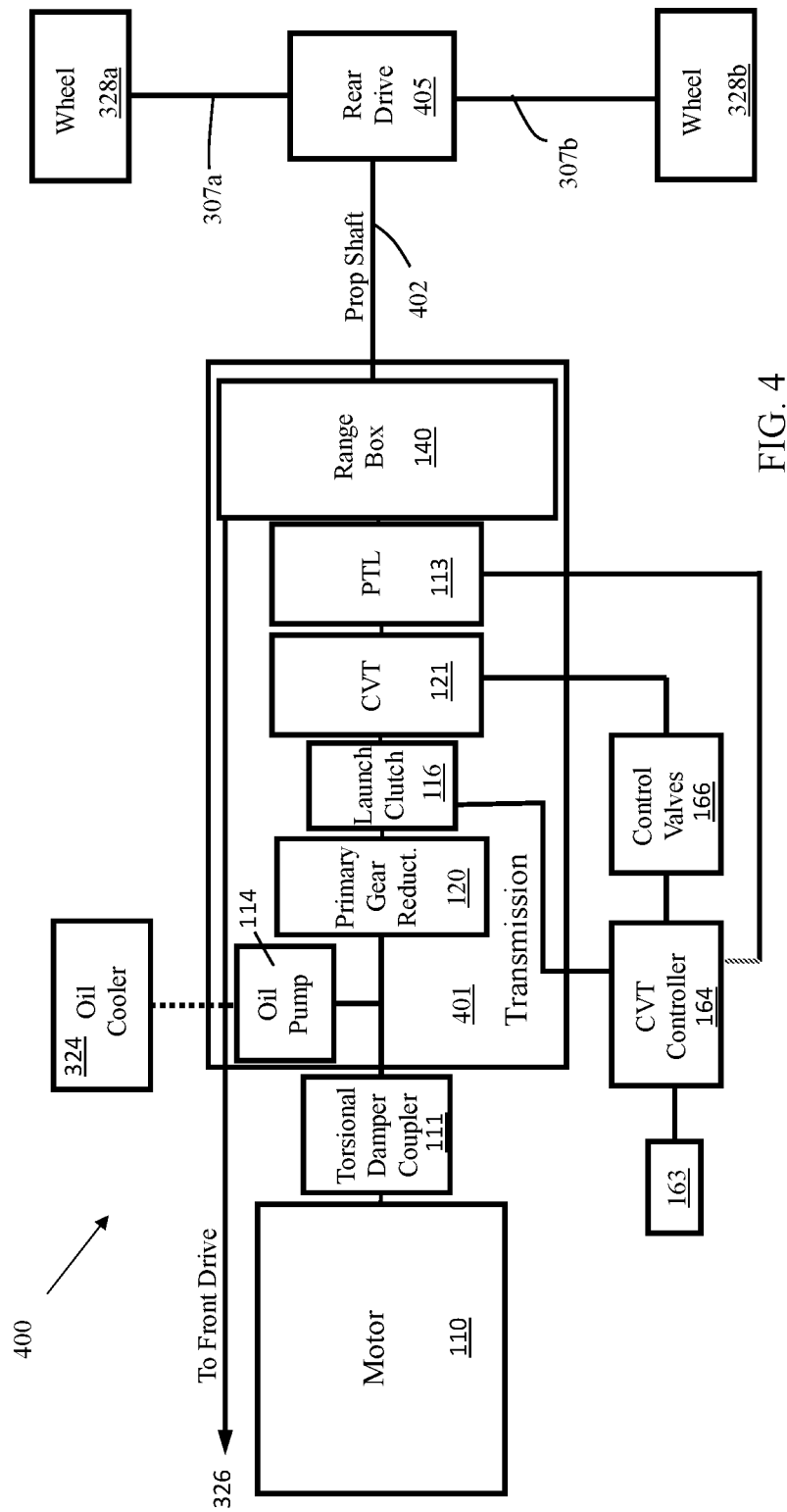
FIG. 4 illustrates a block diagram of a drivetrain layout according to one exemplary embodiment.

Vehicle block diagram 400 of FIG. 4 shows another example vehicle layout with a separate transmission 301 and rear drive 305 (rear differential). Similar to the example configuration of FIG. 3, motor 110 is operationally engaged with the torsional damper coupler 412. The torsional damper coupler 111 is operatively connected or engaged to the oil pump 114 and the primary gear reduction set 120. The oil pump 114 may always spin with the torsional damper coupled 111. The oil pump 114 sends oil to an oil cooler 324 and if needed, to the control valves 166 and in turn to CVT 121. As with the embodiment discussed above, the oil pump 114 may be directly coupled to the torsional damper coupler 111 or a gear reduction can be between the torsional damper coupler 111 and the oil pump 114. Regardless, the oil pump 114 may always spin in concert with the torsional damper 111 and motor 110 in an embodiment. Power (or torque) flowing into the torsional damper 111 and oil pump 114 then goes to the launch clutch 116.

The primary gear reduction 120 is used to move the CVT 121 off axis of the engine 110 in this embodiment. Torque is communicated between the CVT 121 and range box 140 via PTL 113 (second clutch) in this example embodiment. The range box 140 may have one gear set in it or a plurality of gear sets in it. The range box 140 further may have just a forward/reverse gear in it or a hi-low-reverse-park-neutral gear box in it or any combination of gears one wishes to put into it. This example range box 140 has two outputs, one to the front gearbox (not shown) via a prop shaft 326 and one to a rear drive 405 via a rear prop shaft 402. The rear drive 405 (or differential) is in torsional communication with wheels 328a and 328b via half shafts 307a and 307b. The controller 164 monitors numerous sensors on the vehicle and transmission and determines when to engage/disengage the clutches 116 and 113. The controller further controls the ratio of the CVT 121 in this embodiment. The controller 164 does this, in this example embodiment, by sending signals to control valves that increase or decrease pressure to change ratio in a CVT 121.

Figure 6:
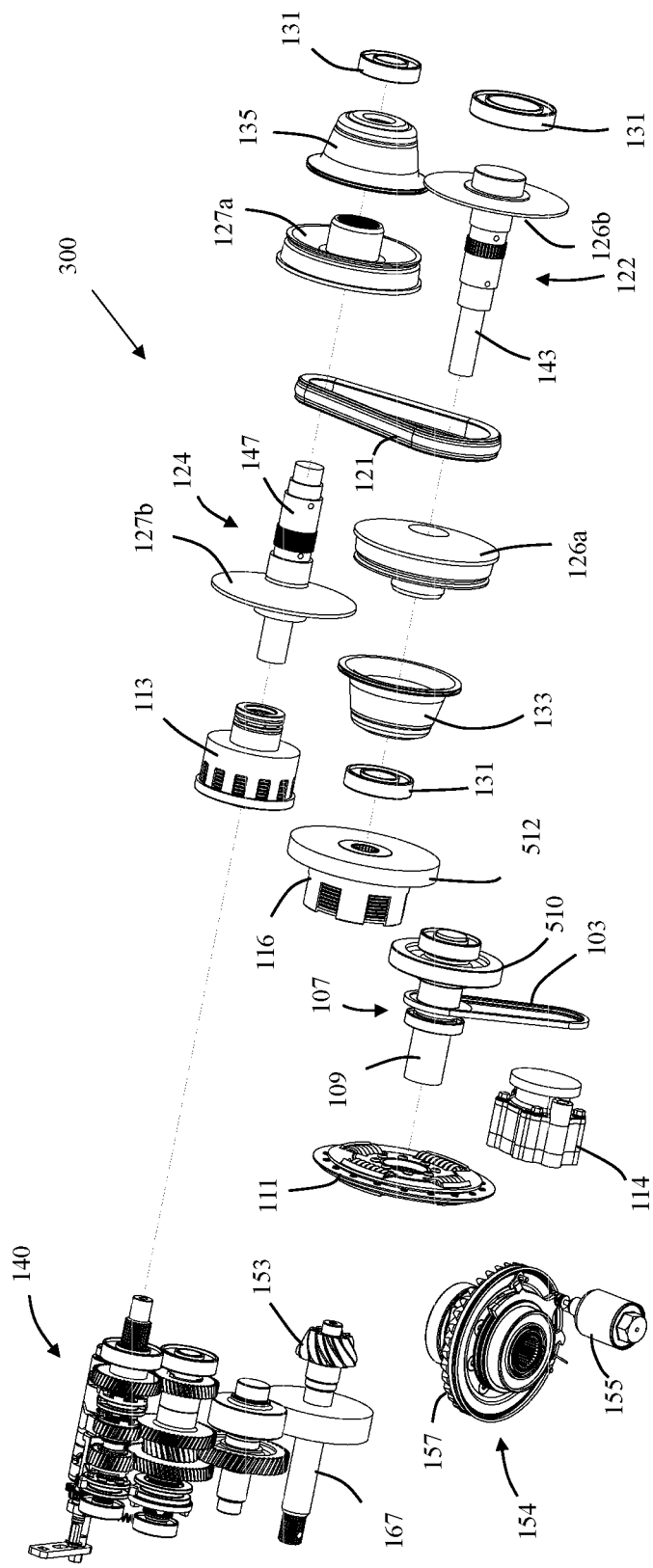
FIG. 6 is an unassembled side perspective view of the portion of the drivetrain of FIG. 5.
Figure 7:
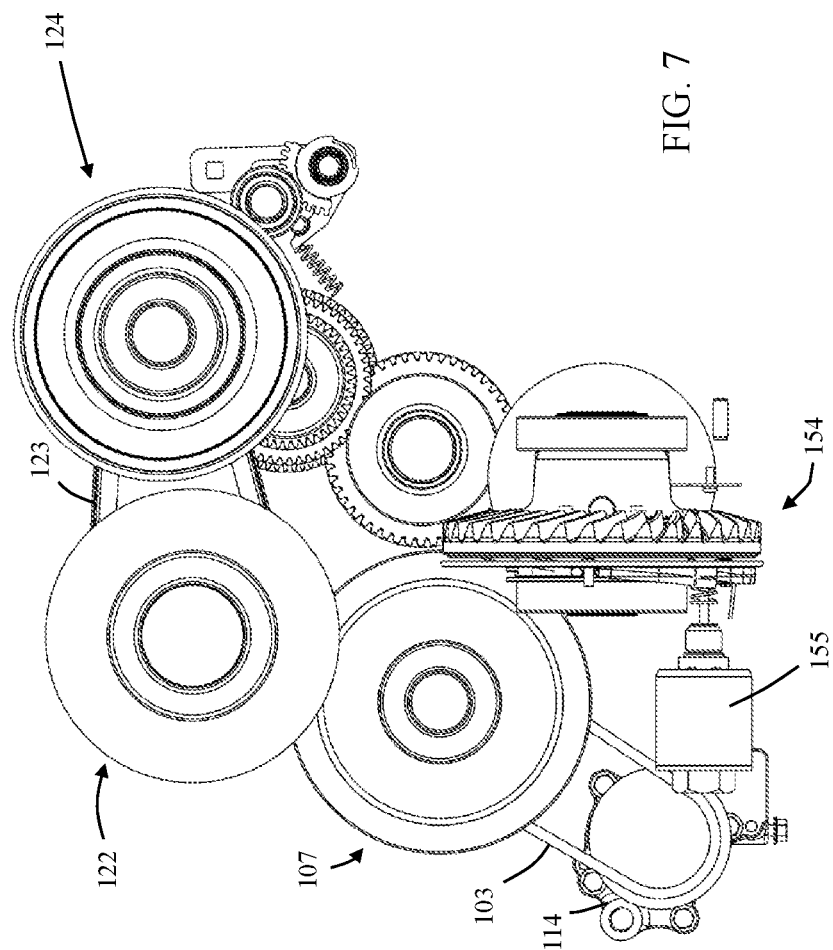
FIG. 7 is in an end view of the portion of the drivetrain of FIG. 5.

FIGS. 5-10 illustrates various views of a portion of the drive train layout 300 that is most similar to the block diagram of FIG. 3 where the drivetrain layout 300 include a transaxle. FIGS. 5 and 7-10 illustrate various assembled views while FIG. 6 illustrates an unassembled view. The partial drivetrain layout 300 is illustrated as including the range box 140 (or transmission assembly), the damper 111 and the pump 114. The pump 114 is operationally engaged to the motor 110 via torsional damper 111 and input shaft 109. FIG. 6 illustrate an input shaft assembly 107. In this example, the pump 114 is in rotational communication with the motor 110 via endless loop member 103, such as but not limited to a belt or chain that is operationally engaged with the input shaft 109.

Further illustrated in the FIGS. 5-10 is the first clutch 116 and primary (drive) and secondary (driven) pulleys 122 and 124 of the CVT 121. A primary shaft 143 of the primary the primary pulley 122 is coupled to the first clutch 116 (launch clutch or launch device). Mounted on the primary shaft 143 is a primary sheave piston 133 and the movable sheave 126a. Further stationary sheave 126b is statically mounted on the primary shaft 143 of the primary pulley 122 of the CVT 121. A secondary shaft 147 of the secondary pulley 124 of the CVT is coupled to the range box 140. Mounted on the secondary shaft 147 is a second sheave piston 135 and the movable sheave 127a. Further stationary sheave 127b is statically mounted on the secondary shaft 147 of the secondary pulley 124 of the CVT. Belt 123, which may be a steel belt or other type of endless loop member, selectively transfers rotational torque between the primary pulley 122 and the secondary pulley 124.

Further illustrated in the FIGS. 5-10 is the second clutch 113 (or PTL) that is positioned between the range box 140 and the secondary shaft 147 of the secondary pulley 124. Also illustrated in the Figures are bearings 131 and a rear drive hub (or rear differential 154. The rear differential includes a ring gear 157 that is operationally engaged to a pinion gear 153 of pinion shaft 167 of the range box 140. An actuator 155 that selectively locks/unlocks the differential as desired is also illustrated. In one embodiment controller 164 is configured to control operation of the actuator based on signals from one or more signal inputs. Ring gear 157 of the differential 154 engages the pinion gear 153 of the range box assembly 140 to transfer torque between the range box 140 and the differential 154.

Figure 11:
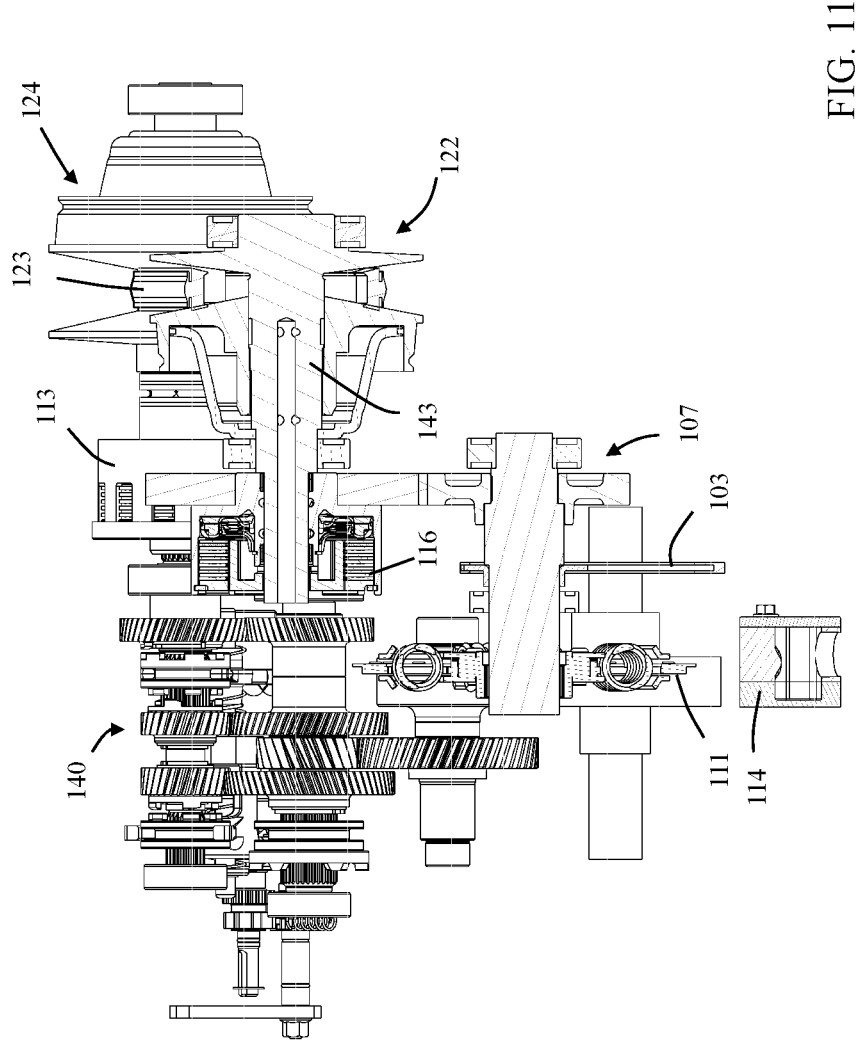
FIG. 11 is a side view of the portion of the drivetrain of FIG. 5 with cross-sectional side views of the primary pulley, the launch clutch, the input shaft assembly and a portion of the pump.
Figure 12:
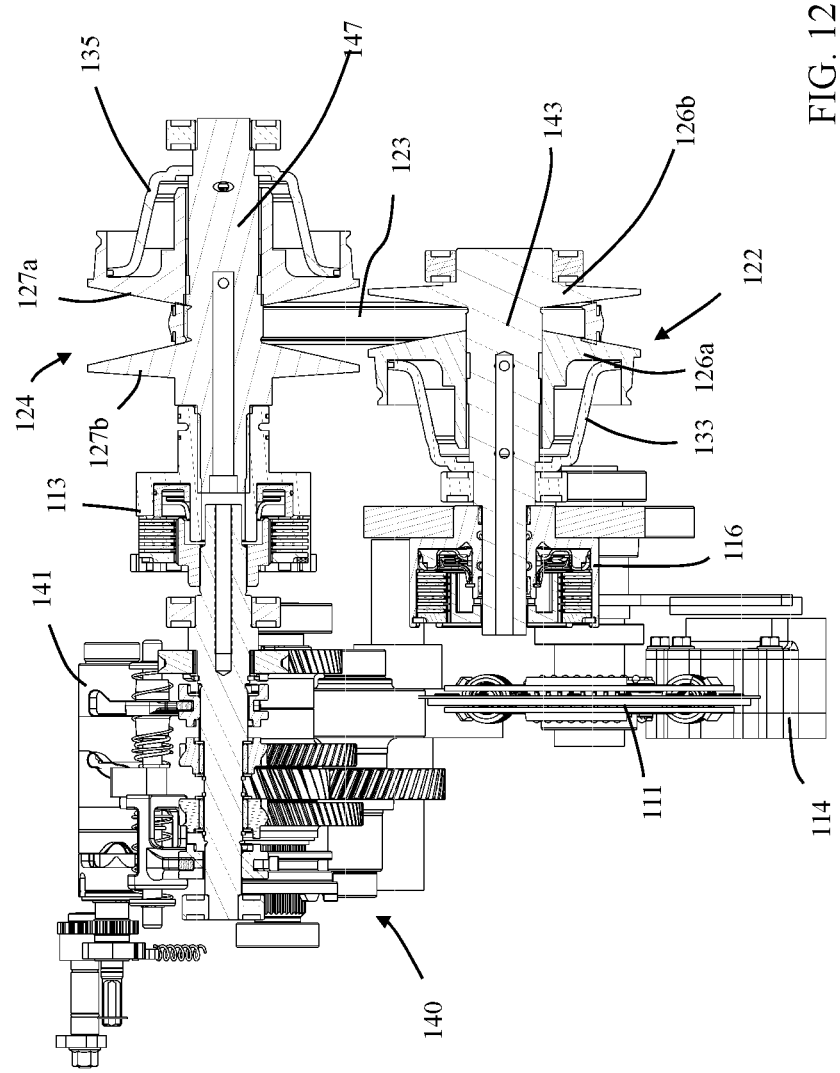
FIG. 12 is a top perspective view of a portion of a drivetrain including cross-sectional views of the primary pulley and secondary pulley according to one exemplary embodiment.
Figure 13:
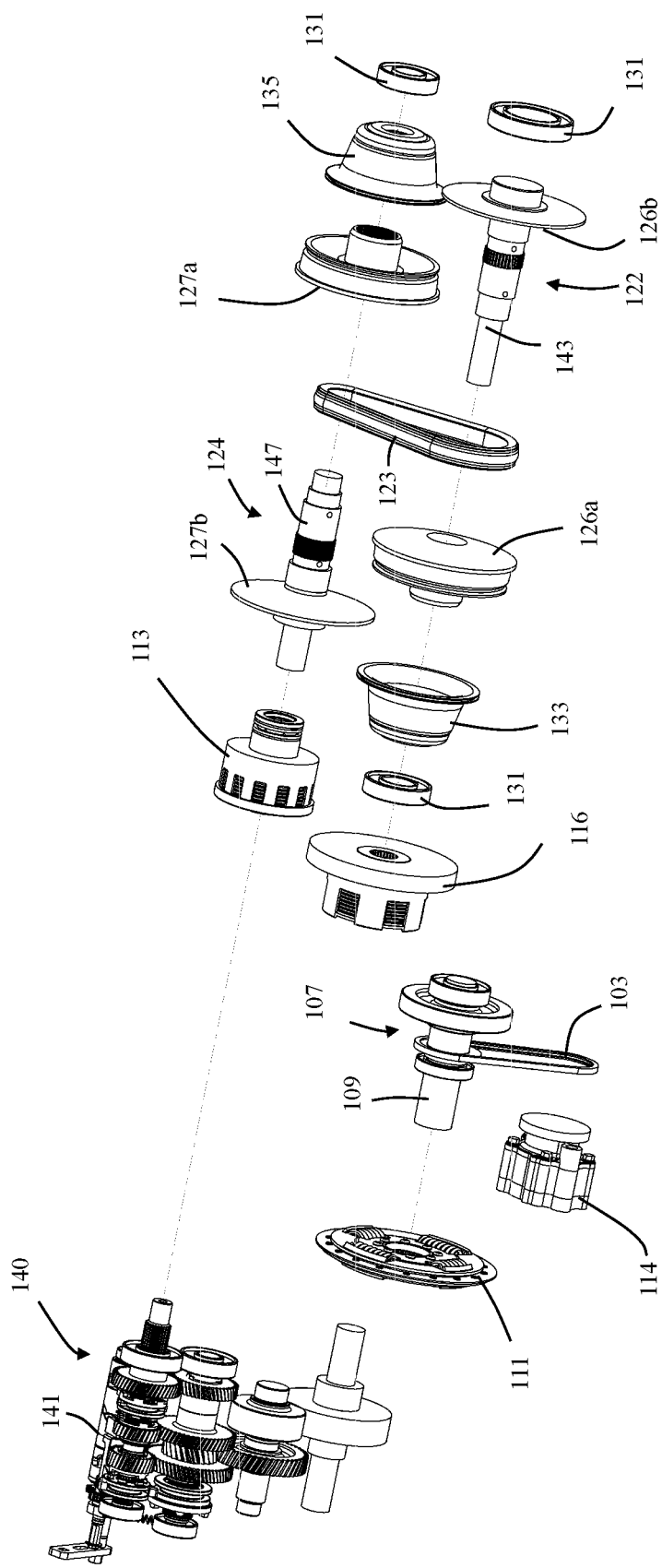
FIG. 13 is an unassembled side view of the portion of the drivetrain of FIG. 12.

FIGS. 11 through 13 illustrate a partial drivetrain layout similar to the drivetrain layout of FIG. 4 where a transmission is used instead of a transaxle. Further in this example, the range box 140 includes a shift drum 141. The shift drum 141 is used to selectively change the gearing in the range box 140.

Example Embodiments

Example 1 is a drivetrain layout that includes a primary gear reduction, a steel belt CVT and a range box. The primary gear reduction is operationally engaged to an output of a motor. The steel belt CVT includes a primary pulley and a secondary pulley. The primary pulley of the steel belt CVT is operationally engaged to the primary gear reduction. The primary gear reduction reduces a rotational speed of the output of the motor that is coupled to the primary pulley of the steel belt CVT. The range box is operationally engaged with the secondary pulley of the steel belt CVT. The range box is configured to coupled torque between the steel belt CVT and wheels of a vehicle.

Example 2, includes the drivetrain layout of Example 1, further including a launch clutch that is in operational engagement between the output of the motor and the primary pulley of the steel belt CVT.

Example 3 includes the drivetrain layout of any of Example, wherein the primary gear reduction further includes a first gear coupled to the output of the motor and a second gear coupled to the launch clutch. The first gear is engaged with the second gear.

Example 4 includes the drivetrain layout of Example 2, wherein the launch clutch is one of a centrifugal force type and a plate style type.

Example 5 includes the drivetrain layout of any of the Examples 1-4, further including a peak torque limiting (PTL) device that is in operational engagement between the secondary pulley of the steel belt CVT and the range box. The PTL device is configured to protect the drivetrain layout from torque transients.

Example 6 includes the drivetrain layout of Examples 5, wherein the PTL device has a first portion coupled to a first shaft of the secondary pulley of the steel belt CVT and a second portion coupled to an input shaft of the range box.

Example 7 includes the drivetrain layout of any of the Examples 1-6, further including a torsional damper coupler that is operationally engaged between the output of a motor and the primary gear reduction.

Example 8 includes the drivetrain layout of any of the Examples 1-7, further including an oil pump, control valves and at least one controller. The oil pump is operationally engaged to the output of the motor. The control valves are in fluid communication with the oil pump. The control valves are further selectively in fluid communication with pistons in the respective primary and secondary pulleys. The at least one controller is configured to control the control valves to move the respective pistons in the primary and secondary pulleys to adjust a clamping force in the respective primary and secondary pulleys based on then current operating conditions of drivetrain layout.

Example 9 includes the drivetrain layout of any of Examples 1-8, wherein the output of the motor is a crank shaft and the primary gear reduction places the steel belt CVT above an axis of the crank shaft.

Example 10 includes the drivetrain layout of any of the Examples 1-9, wherein the primary gear reduction further places the steel belt CVT above an axis of at least a rear differential.

Example 11 includes the drivetrain layout of any of the Examples 1-10, wherein the steel belt CVT further includes a steel belt that is in operational engagement between the primary pulley and secondary pulley to selectively communicate torque between the primary pulley and the secondary pulley wherein the steel belt is one of a belt style and chain style.

Example 12 includes a drivetrain layout including a primary gear reduction, a CVT, a launch clutch, a range box and a peak torque limiting (PTL) device. The primary gear reduction is operationally engaged to an output of a motor. The CVT includes a primary pulley, a secondary pulley and a belt that is operationally engaged between the primary pulley and the secondary pulley. The primary pulley of the CVT is further operationally engaged to the primary gear reduction. The primary gear reduction reduces a rotational speed of the output of the motor that is coupled to the primary pulley of the CVT. The launch clutch is in operational engagement between the primary gear reduction and the primary pulley of the CVT. The range box is operationally engaged with the secondary pulley of the CVT. The range box is configured to couple torque between the CVT and wheels of a vehicle. The PTL device is in operational engagement between the secondary pulley of the CVT and the range box. The PTL device is configured to protect the drivetrain layout from transients.

Example 13 includes the drivetrain layout of Example 12, wherein the primary gear reduction further includes a first gear that is coupled to the output of the motor and a second gear that is coupled to the launch clutch. The first gear is engaged with the second gear.

Example 14 includes the drivetrain layout of any of the Examples 12-13, wherein the launch clutch is one of a centrifugal force type and a plate style type.

Example 15 includes the drivetrain layout of any of the Examples 12-14, further including an oil pump, control valves and at least one controller. The oil pump is operationally engaged to the output of the motor. The control valves are in fluid communication with the oil pump. The control valves are further selectively in fluid communication with pistons in the respective primary and secondary pulleys. The at least one controller is configured to control the control valves to move the respective pistons in the primary and secondary pulleys to adjust a clamping force in the respective primary and secondary pulleys based on a then current operating conditions of drivetrain layout.

Example 16 includes the drivetrain layout of any of the Examples 12-15, wherein the output of the motor is a crank shaft and the primary gear reduction places the belt of the CVT above an axis of the crank shaft and above an axis of at least a rear differential.

Example 17 includes the drivetrain layout of any of the Examples 12-16, wherein the belt of the CVT is a steel belt.

Example 18 includes a vehicle including a motor, a drivetrain layout, at least one differential and a plurality of wheels. The motor is used to generate engine torque. The motor includes an output. The drivetrain layout includes a primary gear reduction, a CVT, a launch clutch, a range box and a PTL device. The primary gear reduction is operationally engaged to the output of a motor. The CVT includes a primary pulley, a secondary pulley and a belt operationally engaged between the primary pulley and the secondary pulley. The primary pulley of the CVT is operationally engaged to the primary gear reduction. The primary gear reduction reduces a rotational speed of the output of the motor that is coupled to the primary pulley of the CVT. The launch clutch is in operational engagement between the output of the motor and the primary pulley of the CVT. The range box is operationally engaged with the secondary pulley of the CVT. The range box is configured to coupled torque between the CVT and wheels of a vehicle. The PTL device was in operational engagement between the secondary pulley of the CVT and the range box. The PTL device configures to protect the drivetrain layout from transients. The at least one differential is operationally engaged with the range box. The plurality of wheels are operationally engaged with the at least one differential.

Example 19 includes the vehicle of Example 18, further including at least one controller. The at least one controller is configured to control operation of at least one the CVT, the launch clutch and the PTL.

Example 20 includes the vehicle of Example 18, wherein the drivetrain layout further includes an oil pump, control valves and at least one controller. The oil pump is operationally engaged to the output of the motor. The control valves are in fluid communication with the oil pump. The control valves are further selectively in fluid communication with pistons in the respective primary and secondary pulleys. The at least one controller is configured to control the control valves to move the respective pistons in the primary and secondary pulleys to adjust a clamping force in the respective primary and secondary pulleys based on a then current operating conditions of drivetrain layout.

Example 21 includes the vehicle of Example 19, further including at least one sensor. The controller configured to control the operation of at least one of the CVT, the launch clutch and PTL based at least in part on at least a signal from the at least one sensor.

Example 22 includes a drivetrain layout that includes a CVT, a range box, and a PTL. The CVT includes a primary pulley and a secondary pulley. The primary pulley of the CVT is operationally engaged to an output of a motor. The range box is operationally engaged with the secondary pulley of the CVT. The range box is configured to coupled torque between the CVT and wheels of a vehicle. The PTL device is in operational engagement between the secondary pulley of the CVT and the range box. The PTL device configured to protect the drivetrain layout from torque transients.

Example 23 includes the drivetrain layout of Example 22, further including, a primary gear reduction and a launch clutch. The primary gear reduction operationally engaged to an output of a motor. The primary gear reduction reduces a rotational speed of the output of the motor that is coupled to the primary pulley of the CVT. The launch clutch is in operational engagement between the output of the motor and the primary pulley of the CVT.

Example 24 includes the drivetrain layout of Example 23, wherein the PTL is configured to be used as a disconnect to allow for true neutral during towing situations.

Although specific embodiments have been illustrated and described herein, it will be appreciated by those of ordinary skill in the art that any arrangement, which is calculated to achieve the same purpose, may be substituted for the specific embodiment shown. This application is intended to cover any adaptations or variations of the present invention. Therefore, it is manifestly intended that this invention be limited only by the claims and the equivalents thereof.

The invention claimed is:

1. A drivetrain layout comprising:
   a primary gear reduction operationally engaged to an output of a motor;
   a continuously variable transmission (CVT) including a primary pulley and a secondary pulley, the primary pulley of the CVT operationally engaged to the primary gear reduction, the primary gear reduction reducing a rotational speed of the output of the motor that is coupled to the primary pulley of the CVT;
   a range box operationally engaged with the secondary pulley of the CVT, the range box configured to coupled torque between the CVT and wheels of a vehicle, the range box including gear sets, the gear sets in the range box including at least one forward gear set and a reverse gear set, further wherein a single engine torque path is provided from the output of the motor through the CVT to the range box; and
   a peak torque limiting (PTL) device in operational engagement between the secondary pulley of the CVT and the range box, the PTL device configured to slip to limit torque spikes through the drivetrain layout.

2. The drivetrain layout of claim 1, further configuring:
   a launch clutch in operational engagement between the output of the motor and the primary pulley of the CVT.

3. The drivetrain layout of claim 2, wherein the primary gear reduction further comprises:

a first gear coupled to the output of the motor; and
a second gear coupled to the launch clutch, the first gear engaged with the second gear.

4. The drivetrain layout of claim 2, wherein the launch clutch is one of a centrifugal force type and a plate style type.

5. The drivetrain layout of claim 1, wherein the PTL device has a first portion coupled to a first shaft of the secondary pulley of the CVT and a second portion coupled to an input shaft of the range box.

6. The drivetrain layout of claim 1, further comprising:
a torsional damper coupler operationally engaged between the output of a motor and the primary gear reduction.

7. The drivetrain layout of claim 1, further comprising:
an oil pump operationally engaged to the output of the motor;
control valves in fluid communication with the oil pump, the control valves further selectively in fluid communication with pistons in the respective primary and secondary pulleys; and
at least one controller configured to control the control valves to move the respective pistons in the primary and secondary pulleys to adjust a clamping force in the respective primary and secondary pulleys based on then current operating conditions of drivetrain layout.

8. The drivetrain layout of claim 1, wherein the output of the motor is a crankshaft and the primary gear reduction positions the CVT off axis from the crankshaft.

9. The drivetrain layout of claim 8, wherein the primary gear reduction further places the CVT off axis from at least a rear differential.

10. The drivetrain layout of claim 1, wherein the CVT further comprises:
a steel belt in operational engagement between the primary pulley and secondary pulley to selectively communicate torque between the primary pulley and the secondary pulley, wherein the steel belt is one of a belt style and chain style.

11. A drivetrain layout comprising:
a primary gear reduction operationally engaged to an output of a motor;
a continuously variable transmission (CVT) including a primary pulley, a secondary pulley and a belt operationally engaged between the primary pulley and the secondary pulley, the primary pulley of the CVT operationally engaged to the primary gear reduction, the primary gear reduction reducing a rotational speed of the output of the motor that is coupled to the primary pulley of the CVT;
a launch clutch in operational engagement between the motor and the primary pulley of the CVT;
a range box operationally engaged with the secondary pulley of the CVT, the range box configured to couple torque between the CVT and wheels of a vehicle, further wherein a single engine torque path is provided from the output of the motor through the CVT to the range box; and
a peak torque limiting (PTL) device in operational engagement between the secondary pulley of the CVT and the range box, the PTL device configured to slip to limit torque spikes through the drivetrain layout.

12. The drivetrain layout of claim 11, wherein the primary gear reduction further comprises:
a first gear coupled to the output of the motor; and
a second gear coupled to the launch clutch, the first gear engaged with the second gear.

13. The drivetrain layout of claim 11, wherein the launch clutch is one of a centrifugal force type and a plate style type.

14. The drivetrain layout of claim 11, further comprising:
an oil pump operationally engaged to the output of the motor;
control valves in fluid communication with the oil pump, the control valves further selectively in fluid communication with pistons in the respective primary and secondary pulleys; and
at least one controller configured to control the control valves to move the respective pistons in the primary and secondary pulleys to adjust a clamping force in the respective primary and secondary pulleys based on then current operating conditions of drivetrain layout.

15. The drivetrain layout of claim 11, wherein the output of the motor is a crankshaft and the primary gear reduction positions a rotational axis of the CVT off axis of the crankshaft and an axis of at least a rear differential.

16. The drivetrain layout of claim 11 wherein the belt of the CVT is a steel belt.

17. A vehicle comprising:
a motor to generate engine torque, the motor having an output;
a drivetrain including,
a primary gear reduction operationally engaged to the output of a motor,
a continuously variable transmission (CVT) including a primary pulley, a secondary pulley and a belt operationally engaged between the primary pulley and the secondary pulley, the primary pulley of the CVT operationally engaged to the primary gear reduction, the primary gear reduction reducing a rotational speed of the output of the motor that is coupled to the primary pulley of the CVT,
a launch clutch in operational engagement between the output of the motor and the primary pulley of the CVT,
a range box operationally engaged with the secondary pulley of the CVT, the range box configured to coupled torque between the CVT and wheels of a vehicle, further wherein a single engine torque path is provided from the output of the motor through the CVT to the range box, and
a peak torque limiting (PTL) device in operational engagement between the secondary pulley of the CVT and the range box, the PTL device configured to slip to limit torque spikes through the drivetrain layout;
at least one differential operationally engaged with the range box; and
a plurality of wheels operationally engaged with the at least one differential.

18. The vehicle of claim 17, further comprising:
at least one controller, the at least one controller configured to control operation of at least one the CVT, the launch clutch and the PTL.

19. The vehicle of claim 17, the drivetrain layout further comprising:
an oil pump operationally engaged to the output of the motor;
control valves in fluid communication with the oil pump, the control valves further selectively in fluid communication with pistons in the respective primary and secondary pulleys; and
at least one controller configured to control the control valves to move the respective pistons in the primary and secondary pulleys to adjust a clamping force in the respective primary and secondary pulleys based on then current operating conditions of drivetrain layout.

20. The vehicle of claim 18, further comprising:

at least one sensor, the controller configured to control the operation of at least one of the CVT, the launch clutch and PTL based at least in part on at least a signal from the at least one sensor.

21. A drivetrain layout comprising:

a continuously variable transmission (CVT) including a primary pulley and a secondary pulley, the primary pulley of the CVT operationally engaged to an output of a motor;

a range box operationally engaged with the secondary pulley of the CVT, the range box configured to coupled torque between the CVT and wheels of a vehicle, further wherein a single engine torque path is provided from the output of the motor through the CVT to the range box;

a peak torque limiting (PTL) device in operational engagement between the secondary pulley of the CVT and the range box, the PTL device configured to slip to limit torque spikes through the drivetrain layout; and a primary gear reduction operationally engaged to an output of a motor, the primary gear reduction reducing a rotational speed of the output of the motor that is coupled to the primary pulley of the CVT.

22. The drivetrain layout of claim 21, further configuring:

a launch clutch in operational engagement between the output of the motor and the primary pulley of the CVT.

23. The drivetrain layout of claim 21, wherein the PTL device is configured to be used as a disconnect device.

\* \* \* \* \*